United States Patent [19]

Rast

[11] 3,822,017
[45] July 2, 1974

[54] CHLORINATION UNIT
[76] Inventor: Wlodzimierz Rast, 38 Hillcrest Dr., Eden Hills, Australia 5050
[22] Filed: Aug. 7, 1972
[21] Appl. No.: 278,456

[30] Foreign Application Priority Data
Aug. 6, 1971 Australia.............................. 5798/71

[52] U.S. Cl................. 210/145, 204/149, 204/212, 204/278, 210/169, 210/192, 210/199
[51] Int. Cl.............................................. C02b 3/06
[58] Field of Search ............. 204/96, 149, 212, 216, 204/248, 278; 210/62, 169, 192, 145, 199

[56] References Cited
UNITED STATES PATENTS

| | | | |
|---|---|---|---|
| 2,970,095 | 1/1961 | Kandler et al. ................. | 204/248 X |
| 3,236,757 | 2/1966 | Litt................................ | 204/248 X |
| 3,351,542 | 11/1967 | Oldershaw et al............. | 210/169 X |
| 3,378,479 | 4/1968 | Colvin et al. ................... | 210/169 X |
| 3,432,420 | 3/1969 | Pan.................................. | 204/216 |

Primary Examiner—John Adee
Assistant Examiner—Robert H. Spitzer
Attorney, Agent, or Firm—Oldham & Oldham Co.

[57] ABSTRACT

An electrical chlorination unit for water having scrapers to mechanically remove white calcium growths or the like from cathodes in the cell by relative movement between cathodes and scrapers, and including acid supply means.

7 Claims, 3 Drawing Figures

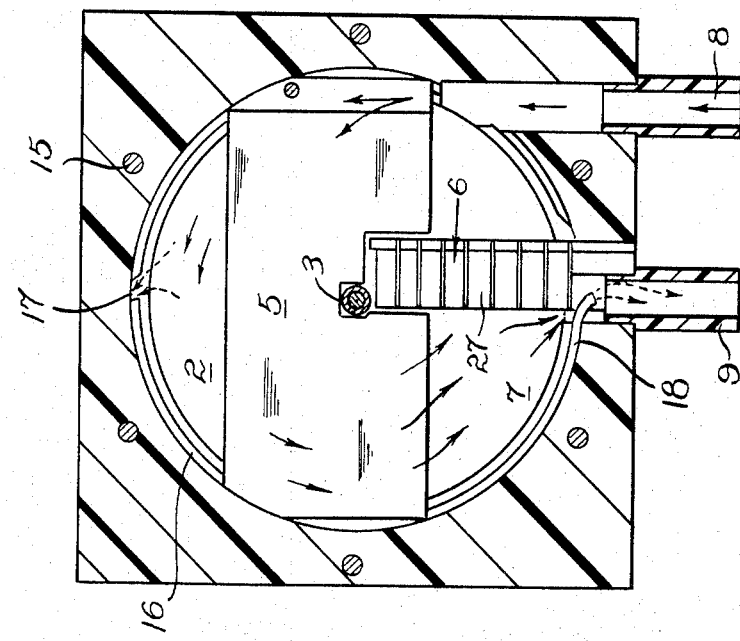
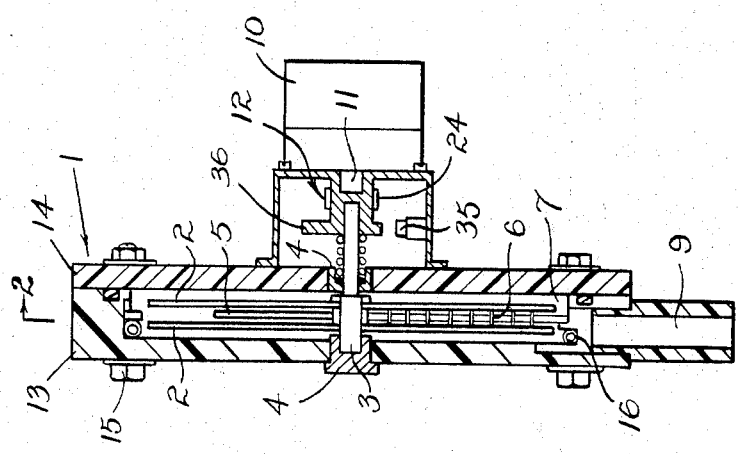

CHLORINATION UNIT

BACKGROUND OF INVENTION

This invention relates to a chlorination unit and in particular it relates to a unit of the type in which an anode and a cathode are used to produce chlorine in water being circulated in swimming pools or the like, although it could be used for other purposes also.

Under the present system it is customary to provide a chlorine producing cell through which some of the water circulating in a pool is passed, the electrodes of the cell being connected to the necessary electrical supply to liberate chlorine and circulate it in the pool to combat bacteriological growths.

One of the problems in cells of this type is that the cathode is subject to white calcium growths which build up on these cells and require to be removed from time to time, and this is at the present time achieved by removing the electrodes from the cell and dipping them into muriatic acid or the like, or by flowing muriatic acid through the cell and draining the acid from the cell when the calcium film has been removed.

While the methods known at present are satisfactory for rejuvenating the cell and removing the impurities from the cathode, the method is subject to the problem that care has to be taken that the muriatic acid or other calcium removing medium does not enter the pool.

An object of the present invention therefore is to provide a method of removing this growth from the cathode without these problems.

It is also necessary in pools and the like to add certain quantities of acids, for instance hydrochloric acid to the water supply and a further object is to provide means to effect such a supply.

SUMMARY OF INVENTION

This is achieved according to the present invention by means which remove the growth mechanically instead of chemically and this is achieved by relative motion between the cathode on which build up occurs, and scraper means in contact with the cathode. A convenient method of achieving this is to have a rotating cathode or cathodes associated with an anode or anodes and with scrapers which will contact the rotating cathode to dislodge any materials which form on its surface, the cathode being rotated slowly by a water motor or by a stepper-motor or the like.

Thus, according to a preferred construction the chlorination unit may comprise a cell having side walls and a peripheral wall, within which cell are bearings supporting a shaft, and on the shaft are cathodes of disc form spaced apart to accommodate between them, with a gap therebetween, an anode or anodes, means being provided to rotate the cathodes, water to be chlorinated entering the cell through an inlet in the peripheral wall and flowing through the cell to leave at an outlet, a water wheel in the path of flow of water to or from the cell having means to engage and drive the cathodes, means being provided to maintain a potential between the cathodes and the anode or anodes, either the cathodes or anodes or both being insulated from the cell, characterised by mechanical scrapers in contact with the cathodes, whereby to mechanically remove deposits such as white calcium growths from the cathodes during rotating of the cathodes.

The acid supply means can be actuated by a switch which is periodically closed by a cam on the rotating cathode shaft, which switch, through a solenoid, allows measured quantities of the acid to flow into the water circuit.

While the invention can be considerably varied, an embodiment will now be described in some detail but it is to be clear that the invention need not necessarily be limited to this.

BRIEF DESCRIPTION OF THE DRAWINGS

FIG. 1 is a transverse section of a cell through which some of the water to be chlorinated is passed, the cell using a pair of rotating cathodes disposed one on each side of an anode, and a pair of scrapers for each cathode, FIG. 2 is a section of same on line 2—2 of FIG. 1.

DESCRIPTION OF PREFERRED EMBODIMENT

Figure 3:
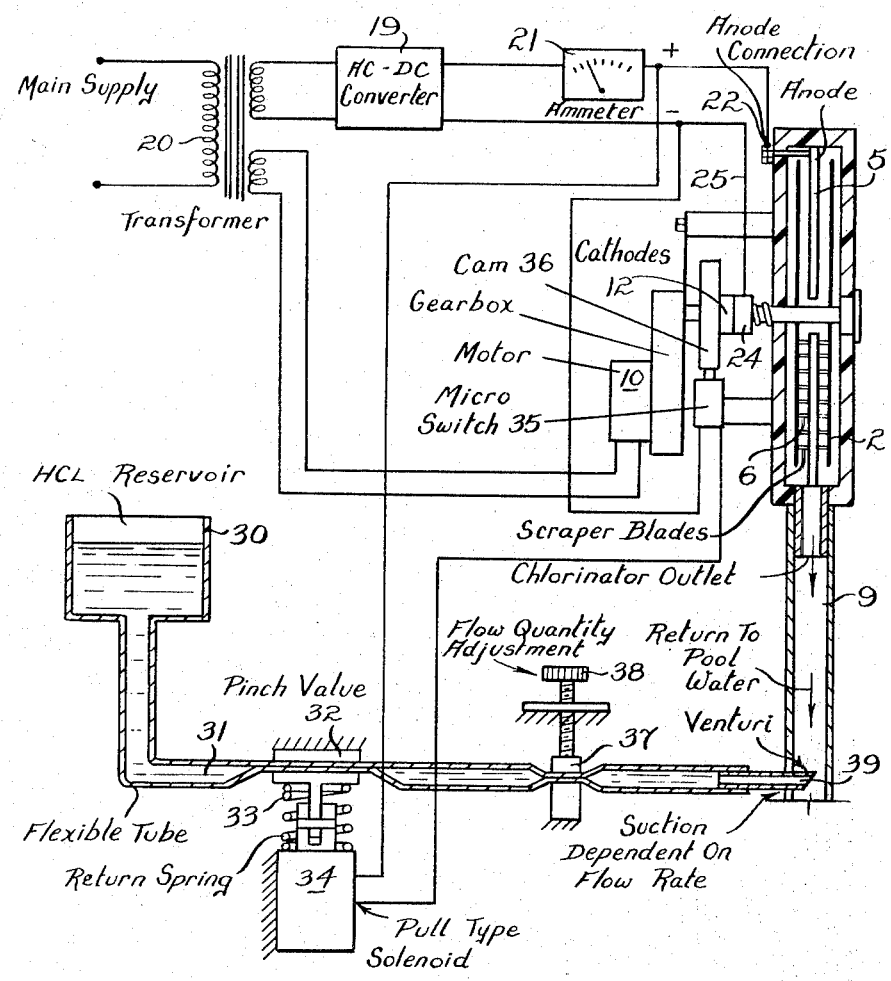
FIG. 3 is a schematic diagrammatic view of a unit showing the flow, electrical connections, and acid supply control.

The cell 1 is adapted to have water from the pool or the like passed through it preferably from a by pass from a circulating pump or the like, the cell having in it a pair of circular cathodes 2 which are mounted on a shaft 3 supported in bearings 4 in the walls of the cell 1, the cell being formed of an insulating material such as "perspex."

These cathodes 2 are spaced apart and have between them an anode 5 which however does not extend to fully surround the area swept by the rotating cathodes so as to leave a space in which scrapers 6 can be positioned.

The shaft 3 can conveniently be horizontally positioned as shown with the discs rotating about such horizontal axis and in that case the anode 5 is disposed between the cathodes 2 in the upper part of the cell 1 while the scrapers 6 are positioned in the lower part of the cell so that as they remove deposits from the rotating cathodes 2. The deposits can fall down into the bottom part 7 of the cell to be flushed away by the flow of water to be halved in a filter if required.

Water is admitted to the cell 1 through the inlet 8 and flows through the cell and out through the outlet 9.

An electric motor 10 with attached reduction gear box slowly revolves the output shaft 11 of the gear box and the coupling 12 engaged by it which in turn engages the shaft 3 on which the cathodes 2 are attached. It will be noted that the cell 1 has a main portion 13 housing the components in a hollow within it, and a cover 14 fixed thereto by bolts 15, the main portion comprising a side wall and a peripheral wall, the cover forming the other side wall.

The drive could be from a water motor having an elastomeric driving wheel engaging one of the cathode disc peripheries or the driving wheel could have teeth engaging teeth on the periphery of one cathode, or alternatively, a stepper motor could have a resilient driving blade engaging notches in the periphery of one of the cathodes to drive the cathodes.

The method of driving is not important so long as a relatively low rate of rotation is achieved, which should be such that the scrapers can remove the deposits from the cathodes.

To ensure that gas does not accumulate in the top of the cell 1, gas being formed during the process, a gas draw-off tube 16 is located in cell 1, the inlet 17 of which is at the top of the cell and the outlet 18 is in the water outlet 9 so that the gas is drawn into the water by water flow past such outlet 18, the outlet having a higher rate of flow than in the cell itself because of volumetric differences to give a suction at the tube outlet.

The cathodes 2 and the anode 5 are energised from direct current supply obtained from the converter 19 fed from a transformer 20, the anode 5 having a connection through the ammeter 21 to a terminal 22 which connects to the anode 5, while the cathodes 2 are connected to the supply source through coupling 12 which has a commutator ring 24 on it engaged by a contact on the negative lead 25 from the converter 19.

While in the foregoing a pair of rotating cathodes have been referred to, it would be possible to use a single cathode with a pair or even a single anode associated therewith, or a multiple unit can be constructed in which a series of cathodes are used with anodes interleaved between them but leaving a sufficient space to have scrapers in engagement with the rotating cathodes at appropriate localities.

The scrapers 6 can take any convenient form but preferably comprise blades 27 which are formed of a series of narrow sections which resiliently engage the cathodes with a scraping action. Such blades are torsion or spring loaded to have the necessary scraping contact, and can be formed of a spring material slotted at intervals to maintain overall contact.

The blades 27 can be used on any area where there is a possibility of the white calcium growth forming.

Many variations will fall within the spirit of the invention which is directed to the use of mechanical cleaning of cathodes as opposed to chemical cleaning thereof.

The acid feed comprises a reservoir 30 having a tube 31 leading therefrom, which tube passes through a pinch-valve 32 which is loaded by a spring 33 to a closed position but is actuated to open by a solenoid 34 controlled from a switch 35 which in turn is actuated by a cam 36 on the coupling 12.

A quantity regulating pinch-valve 37 operated from an adjustment screw 38 allows the amount of acid periodically admitted to be controlled, the acid feeding into the water outlet 9 through a venturi tube 39.

The venturi, because it depends on suction generated by the velocity of the water past it, regulates quantity to increase acid addition with increased water flow.

OPERATION OF UNIT

Water enters the cell 1 at a relatively high velocity, and flows in a circular or laminar manner because the cell is divided by the anode and cathode members which are parallel to the sides of the cell, and the direction is determined by the tangential position of the water inlet tube 8. The water leaves the cell through the outlet 9 at a relatively high velocity.

The tube 11 with one end in the cell (low velocity region) and the other in the cell outlet 9 (high velocity region), causes gases produced by the cell reaction which accumulate at the top of the cell to be removed due to the suction and these gases are passed through the tube into the outlet water.

Due to the direction of the water flow, the deposit scrapped off the cathodes 2 is swept out of the cell through the outlet 9.

Acid is periodically added to the water flowing through the outlet 9 due to the restriction at the venturi tube 39, and low pressure is experienced at the outlet of the acid feed. This pressure is dependent on the flow rate of water from the cell, thus giving automatic acid feed adjustment for filter-pump flow rate variations.

It has been found that with flow adjustment by the pinch-valve 37 a balance between acid in flow to increase in alkalinity can be reached for long periods, keeping pool water in a neutral condition.

I claim:

1. A chlorination unit comprising a substantially circular cell of insulating material having side walls and a peripheral wall, bearings in said side walls of the cell supporting a shaft, cathodes of disc form closely spaced apart but fixed to the shaft, an anode having voids therein and being positioned in the space between the said cathodes and close thereto, means to rotate the shaft which supports the said cathodes, a tangential inlet to the cell to receive water to be chlorinated, an outlet from the cell at the bottom thereof for water flowing through the said cell, means to maintain a potential between the cathodes and the anode, and mechanical scapers having a center plane contained in coplanar relationship with the plane of the anode in said voids and supported by the said cell in the lower portion thereof and in contact with the said cathodes, whereby to mechanically remove deposits such as white calcium growths from the cathodes during rotating of the cathodes, the flow of water sweeping around the cell and removing the removed deposits through the outlet.

2. A chlorination unit according to claim 1 where said cell is positioned in a vertical plane with said inlet at its top, characterised by a tube extending from the top of the said cell to the said outlet whereby by pressure difference between the inside of the cell and water flow through the outlet any gas rising into the top of the said cell is drawn out by the outflowing water.

3. A chlorination unit according to claim 1 characterised by said shaft rotation means comprises a motor and a gear box attached to said cell to rotate said shaft and therewith said cathodes, means on the shaft to periodically close a switch dependent upon the rotation of said shaft, an acid supply container, a flexible tube leading from said container to a venturi tube in the outlet from said cell, and a solenoid pinch-valve engaging said tube arranged to periodically open said tube under control of said switch whereby to feed regulated quantities of acid into said water under control of the suction at said venturi tube.

4. A chlorination unit as in claim 1 and where said scrapers are fully positioned in the plane of the anode but protrude therefrom in both directions to terminate in two face surfaces each one of which is in contact with a cathode disc.

5. A chlorination unit as in claim 1 where said anodes are of different shapes and of smaller areas than said cathodes to provide said voids.

6. A chlorination unit according to claim 1 characterised by an acid supply supplied to a venturi tube in the water outlet from said cell whereby the quantity supplied is at least in part controlled by the rate of water flow past said venturi tube.

7. A chlorination unit according to claim 6 characterised by a motor to rotate said cathodes while in contact with said scraper means which are fixed in said cell, and by a cam driven with said cathodes to intermittently actuate said acid supply to said venturi tube.

* * * * *